(12) United States Patent
Cok et al.

(10) Patent No.: US 6,892,014 B2
(45) Date of Patent: May 10, 2005

(54) DISPLAY DEVICE HAVING A FIBER OPTIC FACEPLATE

(75) Inventors: Ronald S. Cok, Rochester, NY (US); Michael E. Miller, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 274 days.

(21) Appl. No.: 10/201,707

(22) Filed: Jul. 23, 2002

(65) Prior Publication Data

US 2004/0017985 A1 Jan. 29, 2004

(51) Int. Cl.⁷ .................................................. G02B 6/04
(52) U.S. Cl. ....................... 385/120; 385/116; 345/697
(58) Field of Search ............................ 385/120, 115, 385/116, 39, 49; 345/695, 697, 694

(56) References Cited

U.S. PATENT DOCUMENTS 5,465,315 A   11/1995  Sakai et al.
5,684,905 A  * 11/1997  Sugawara et al. .......... 385/120
5,796,375 A  *  8/1998  Holloman .................... 345/75.2
2001/0014199 A1 *  8/2001  Veligdan et al. ............ 385/120
2004/0046714 A1 *  3/2004  Elliott et al. .................. 345/55

FOREIGN PATENT DOCUMENTS

EP          324147 A2 *  7/1989  ............ G02B/6/04
JP          7-28050       1/1995
JP          7-261166     10/1995

* cited by examiner

Primary Examiner—Rodney Bovernick
Assistant Examiner—Sung Pak
(74) Attorney, Agent, or Firm—Andrew J. Anderson; Thomas H. Close

(57) ABSTRACT

A display device includes: an array of color pixels each color pixel including a plurality of individually addressable sub-pixels for emitting different colored light; and a fiber optic faceplate arranged adjacent the array of color pixels, with one fiber for each color pixel.

10 Claims, 4 Drawing Sheets

DISPLAY DEVICE HAVING A FIBER OPTIC FACEPLATE

FIELD OF THE INVENTION

The present invention relates to light emitting color display devices and more particularly to color display having fiber optic faceplates.

BACKGROUND OF THE INVENTION

Digital imaging displays use individual addressable picture subpixels or pixels to display imagery and data on the displays. These pixels are designed to meet a variety of objectives for a product and for manufacturing processes. For example, pixel layout density, process design rules, interconnect cross-talk, and power distribution are all concerns for imaging displays. The displays are also designed to match the needs of the human visual system.

Typical pixel layouts used in digital imaging displays are shown in FIGS. 2 and 3. Referring to FIG. 2, a prior art stripe pattern of alternating red 10, green 12, and blue 14 light emitting pixel columns are interspersed with non-light emitting areas. A typical design attempts to reduce the amount of non-light emitting area to increase the amount of light that can be emitted from the device. The ratio between the light emitting area and the non-light emitting area is called the fill factor. Referring to FIG. 3, a prior art delta pattern is illustrated in which alternate rows 22 and 24 of the stripes of FIG. 2 are placed out of phase.

Digital imaging displays using the pixel layouts illustrated in FIGS. 2 and 3 can be found in various display technologies. In particular, they may be applied in organic light emitting diode (OLED) displays. OLED displays have many advantages as a flat-panel display device and are useful in optical systems.

It is well known in the art to use fiber-optic subpixels in conjunction with display devices to transport the light from a display to a different location. Conventionally, fiber subpixels or faceplates are placed above the cover of a display, for example an LCD or OLED device. Sakai et al. describe a tiled display application in U.S. Pat. No. 5,465,315, issued Nov. 7, 1995, using fiber arrays in conjunction with LCD displays. However, most fiber subpixels or light pipes have a circular cross-section. This circular cross-section does not match the typical, rectangular shape of pixels causing light loss in coupling from a display to a fiber for applications in which a single fiber or light pipe is associated with pixels or subpixels. In the best case, only 78% of the light from a square pixel enters a circular light fiber centered on, and touching, a square pixel, as shown in FIG. 4. Referring to FIG. 4, a circle 30 is shown superimposed above a square 32 circumscribing it. If the fibers are made larger, so as to cover a greater portion of the area of the pixel (as shown in FIG. 5, which illustrates a square 32 circumscribed by a circle 40), the density of pixels is reduced. Rectangular pixels with larger aspect ratios become progressively worse. The situation is exacerbated when the fill factor of the display is taken into account. Any non-light emitting area located within the fiber area is effectively wasted and increases the cost of the fiber. If the fibers are made very small so that many fibers are associated with every pixel, costs also increase and the fill factor of the device is replicated on the viewing surface. Moreover, fiber plates with many small subpixels are more expensive than arrays of larger plastic light pipes. If single, larger fibers are associated with an entire conventional three-color pixel, the fill factor and light coupling are even more problematic.

JP07028050 entitled "Image Display Device" describes an image displaying device where many dot-shaped pixels are arranged two-dimensionally and a filter consisting of optical fibers is arranged on the display optical path of the image displaying device. It is also known to create hexagonal pixel shapes as described in, for example, JP 7261166 A.

In all of these designs, one or more fibers or light pipes are associated with a single pixel subpixel of one color. Hence, the fiber subpixels associated with each color component of a pixel must be small relative to the pixel size.

There is a need therefore for an improved color display design with improved coupling to an optical fiber faceplate.

SUMMARY OF THE INVENTION

The need is met according to the present invention by providing a display device that includes: an array of color pixels each color pixel including a plurality of individually addressable subpixels for emitting different colored light; and a fiber optic faceplate arranged adjacent the array of color pixels, with one fiber for each color pixel.

ADVANTAGES

The present invention has the advantage that it increases the efficiency of display devices having optical fiber faceplates.

DETAILED DESCRIPTION OF THE INVENTION

Figure 1:
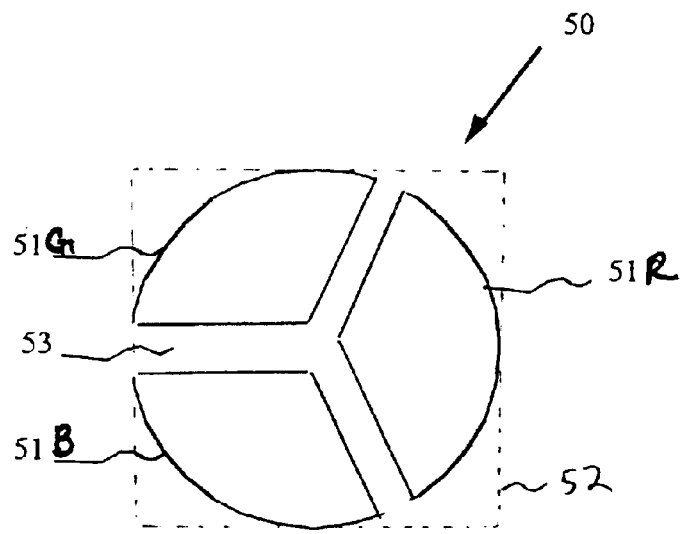
FIG. 1 is a diagram illustrating a circular three-color pixel having pie-shaped subpixels according to one embodiment of the present invention.
Figure 2:
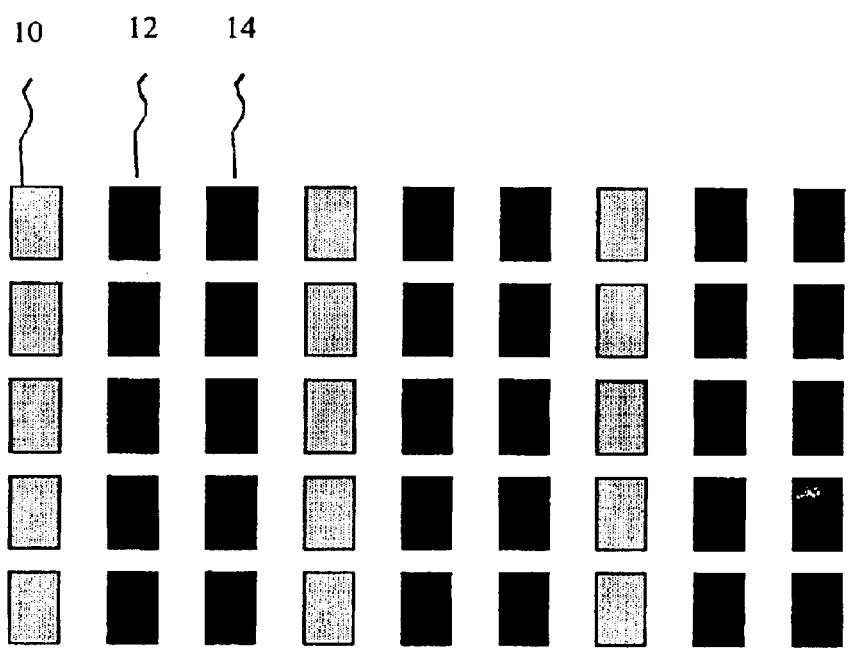
FIG. 2 illustrates a prior art striped pattern for flat-panel displays.
Figure 3:
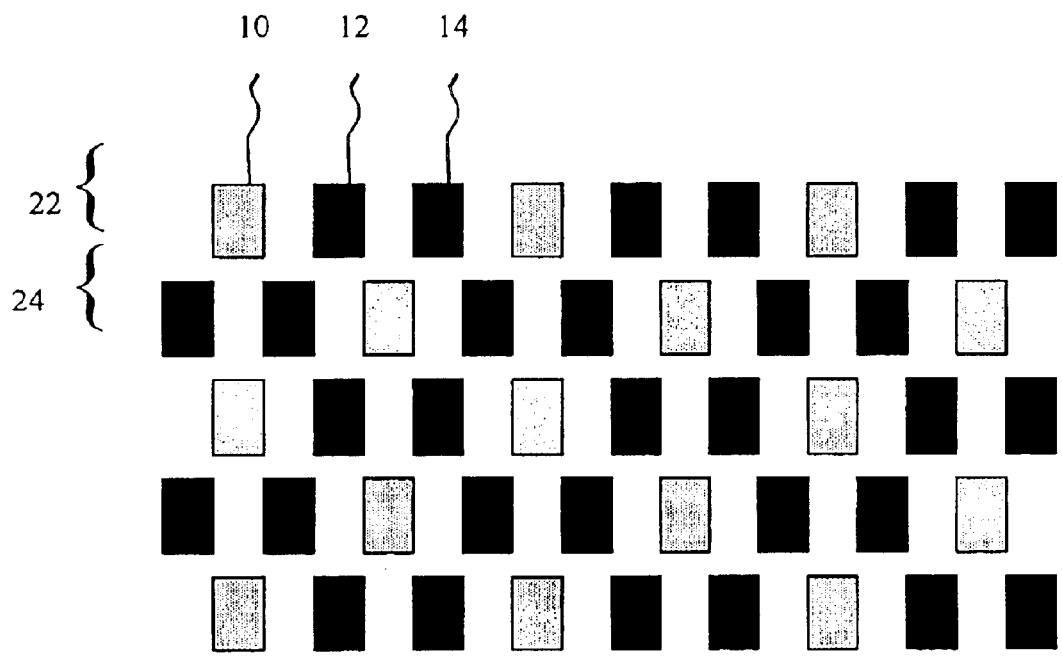
FIG. 3 illustrates a prior art delta pattern for flat-panel displays.
Figure 4:
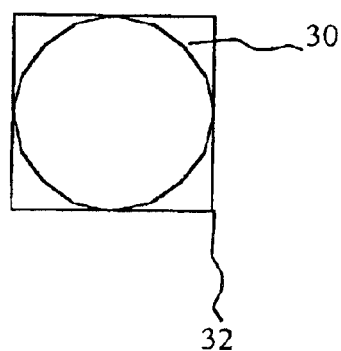
FIG. 4 is a diagram showing a circular light pipe having a diameter equal to the side of a square pixel.
Figure 5:
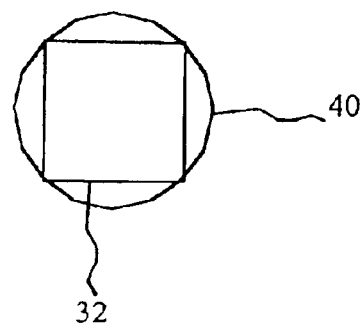
FIG. 5 is a diagram showing a circular light pipe having a diameter equal to the diagonal of a square pixel.
Figure 6:
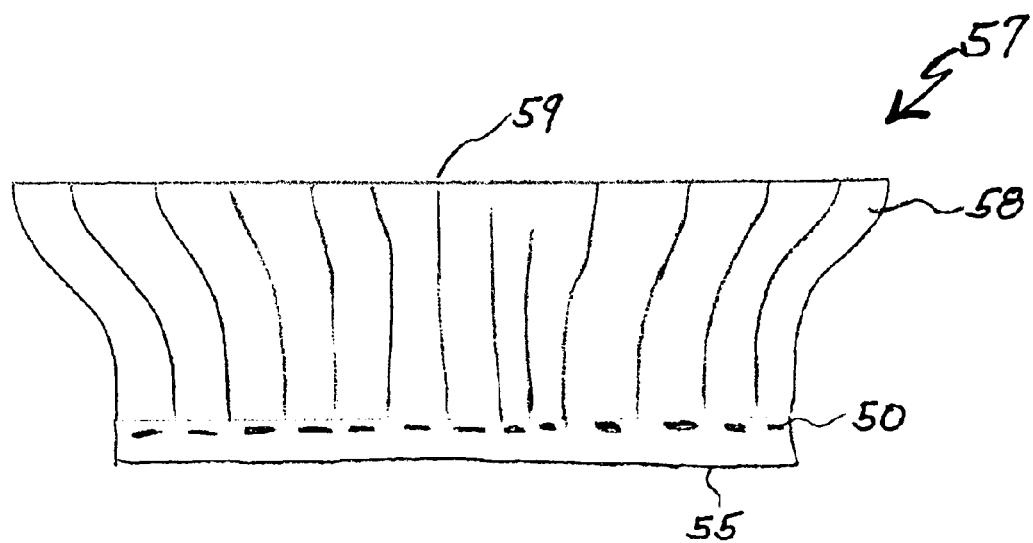
FIG. 6 is a side view of a display device having a fiber optic faceplate.

Referring to FIG. 1, one embodiment of the present invention is shown. In FIG. 1, the pixel geometry consists of a circular light-emitting, three-color pixel 50 with three subpixels 51R, G, and B within a square pixel area 52 wherein each subpixel is a different color. Although the subpixels are shown having equal sizes, they may be of different sizes. Any necessary circuitry, for example power and control connections and transistors are located around the pixel 50, for example in the corners of the square area 52. Referring to FIG. 6, a display device 57 includes an array 55 of pixels 50, configured according to the present invention, located in close alignment with light pipes or optical fibers 58 in a fiber optic faceplate 59 located over the array of pixels 50 to convey the light to a preferred location. The array of pixels 50 may form a two-dimensional regular array as is well known for traditional displays.

In practice, tolerance limitations of manufacturing processes require that the active area of subpixels have a gap 53 between them as illustrated in FIG. 1. The degree of separation is specified by the tolerances of the manufacturing process.

Figure 7:
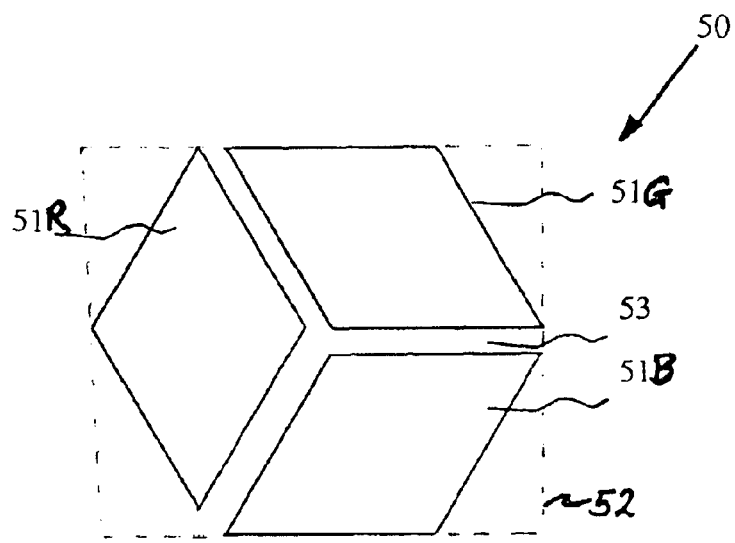
FIG. 7 illustrates a hexagonal pixel according to one embodiment of the present invention.

Some manufacturing processes or display layout geometries can be further constrained in the shapes and orientation of features that are supported. In an alternative embodiment of the present invention, subpixels can be limited to shapes having straight edges. For example, a hexagonal shaped pixel can be utilized as shown in FIG. 7. Each of the three colored subpixels 51R, G, B is a rhombus that together, forms a hexagonal pixel 50 within a square pixel area 52. The pixel 50 is shown with gaps between the subpixels 51. In this example, it is straightforward to make the three subpixels 51 the same size, since the hexagonal shape of pixel 51 is readily divided into three identical portions.

Figure 8:
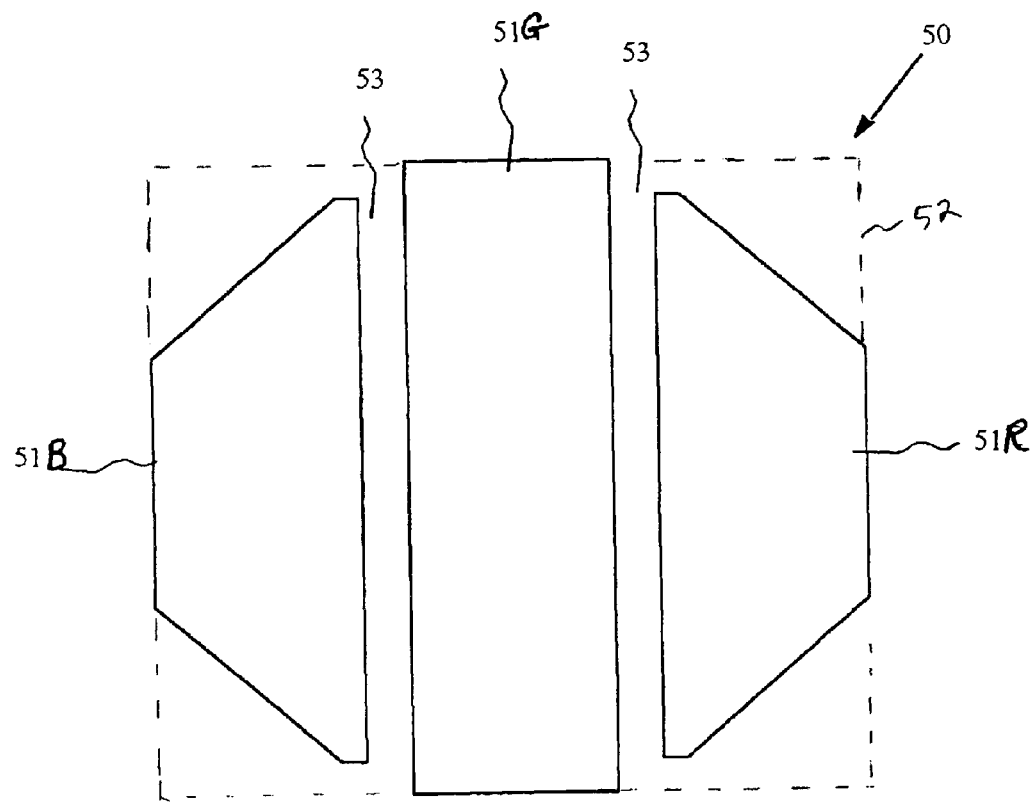
FIG. 8 illustrates an octagonal pixel according to one embodiment of the present invention.

In an alternative embodiment, an octagonal shape can be utilized as shown in FIG. 8. Octagonal pixel shapes may be preferred since they have edges at 45 degrees to the vertical and horizontal, thus improving the display quality for diagonal lines. The pixel 50 comprises the three color subpixels 51R, G, B as shown within a square pixel area 52. In an octagon, the central rectangle includes one half of the area while the two side subpixels include the other half of the area. Hence, in order to make the three subpixels the same size, the central rectangle has an edge smaller than the edge of the octagon and the side subpixels include some of the central area.

Figures 9, 10:
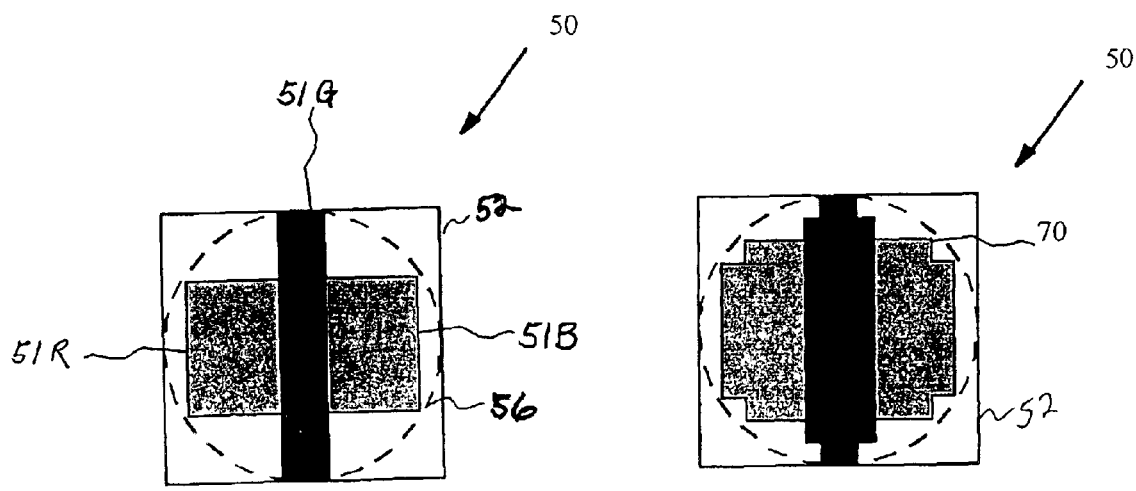
FIG. 9 illustrates a cruciform pixel according to one embodiment of the present invention.
FIG. 10 illustrates a rectilinear pixel with smaller features according to one embodiment of the present invention.

In a further alternative embodiment, the features of the pixel are rectilinear. Rectilinear shapes are easier to lay out and are more compatible with conventional interconnect and electronic component structures, such as those found in an active matrix display. Referring to FIG. 9, a pixel 50 has three components 51, a central rectangle and two side subpixels whose aspect ratio is approximately the inverse of the central rectangle. The pixel 50 represents the active, light-emitting area of the pixel, the square 52 represents the entire pixel area, including any non-light emitting elements such as wiring, transistors and capacitors (not shown) within the square 52. As shown in FIG. 9, the light emitting area is largely included within a circle 56 circumscribed by the square 52 so that a light fiber with a circular cross-section placed in close proximity to the pixel 50 will transmit nearly all of the light emitted by the pixel 50. At the same time, the pixel area 52 and light emitting subpixels 51 have rectilinear boundaries, thereby enhancing the manufacturability of the display. The relative widths and heights of the subpixels 51R, G, B may be altered to suit differing fill factors, color intensities or lifetimes of the color components or materials.

Given, as an example, a 50% fill factor in a square layout, one half of the overall pixel area 52 is filled with equal sized light emitting subpixels 51. In this case, if the pixel edge is designated h and the width of the vertical component is x, then the area of subpixel 51G is hx. The area of subpixels 51R and B are the same and equal to the area of 51G. For convenience in design, we can arbitrarily set the height of subpixels 51R and B to one half that of subpixel 51G and the width of the square area 52 equal to the height. Therefore, hx=(h/2)((h/2)−x). Solving for x yields x=h/6. Therefore, for a configuration in which the fill factor is 50%, the three color subpixels are of equal size and half the height of the central subpixel, the central subpixel is h by h/6 and the two side subpixels are h/2 by h/3. All have the same area: $h^2/6$. In this configuration, the present invention improves the light coupling area from 39% to nearly 100%. Moreover, the fill factor of the viewed side of the array of light pipes can be, for example, 78% if the circular pipes are touching, while the fill factor of the display device itself is only 39%. This improvement is not possible if many small fibers are used in a traditional face-plate.

The configuration of FIG. 9 provides large rectilinear feature sizes. If smaller feature sizes and tolerances can be achieved in a manufacturing process, the shape of the light emitting pixel 50 can become more circular, thus enhancing the coupling of light from the light emitting pixel to the fiber. For example, FIG. 10 illustrates a rectilinear layout that is more nearly circular but has smaller rectilinear features. In FIG. 10, the subpixels have stepped edges 70. The exact configuration of the edges will depend on the various factors cited above.

It is also known to provide fiber optic faceplates with light pipes having rectangular cross sections. In such a case, the pixel and subpixels can be rectangularly shaped.

A wide variety of configurations using the present invention are possible. Different fill factors may be used, the colors may change position or relative size, the horizontal and vertical components can be exchanged, the ratio of height of the horizontal components to the vertical may be changed. In particular, the subpixels may be of different sizes to accommodate differences in efficiency or lifetimes of the materials comprising the different colored subpixels.

The present invention can applied to emissive displays made of OLED materials, either top- or bottom-emitting (emitting light from the cover or the substrate). The fiber optic faceplate can comprise the cover or substrate of the OLED display device.

The invention may be employed in a device that includes Organic Light Emitting Diodes (OLEDs) which are composed of small molecule or polymeric OLEDs as disclosed in but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light emitting displays can be used to fabricate such a device.

The invention has been described in detail with particular reference to certain preferred embodiments thereof, but it will be understood that variations and modifications can be effected within the spirit and scope of the invention.

Parts List

| | |
|---|---|
| 10 | red pixel |
| 12 | green pixel |
| 14 | blue pixel |
| 22 | row of stripes |
| 24 | row of stripes |
| 30 | circle |
| 32 | square |
| 40 | circle |
| 50 | color pixel |
| 51R | red subpixel |
| 51G | green subpixel |
| 51B | blue subpixel |
| 52 | square pixel area |
| 53 | gap |
| 55 | pixel array |
| 56 | circle |

-continued

| | |
|---|---|
| 57 | display device |
| 58 | light pipe or optical fiber |
| 59 | fiber optic faceplate |
| 70 | stepped edges |

What is claimed is:

1. A display device, comprising:
   a) an array of color pixels each color pixel including a plurality of individually addressable subpixels for emitting different colored light; and
   b) a fiber optic faceplate arranged adjacent the array of color pixels, with one fiber for each color pixel;
   wherein the fibers of the fiber optic faceplate have circular cross-sections and where the subpixels comprise individual shapes limited to straight edges and are arranged to form pixels having polygonal shapes with at least six sides, and wherein the pixels are circumscribed by the circular cross-section of a fiber.

2. The display device claimed in claim 1, wherein the subpixels emit red, green and blue light.

3. The display device claimed in claim 1, wherein pixels are cruciform shaped and the subpixels define portions of the cruciform shape.

4. The display device claimed in claim 1, wherein the pixel is octagonal shaped and the subpixels define portions of the octagonal shape.

5. The display device claimed in claim 1, wherein the pixel is hexagonal shaped and the subpixels define portions of the hexagonal shape.

6. The display device claimed in claim 1, wherein the subpixels are OLEDs.

7. The display device claimed in claim 1, is a tiled display having a plurality of arrays of color pixels and fiber optic faceplates, and wherein the fiber optic faceplates are image enlarging fiber optic faceplates, each having a small face and a large face, with the small faces being arranged adjacent the arrays of color pixels.

8. The display device claimed in claim 1, wherein the fiber optic faceplate is an image enlarging faceplate having a large face and a small face, with the small face adjacent the array of color pixels.

9. The display device claimed in claim 1, wherein the pixel is rectilinearly shaped and the subpixels define portions of the rectilinear shape.

10. The display device claimed in claim 9, wherein the pixel comprises a central rectilinearly shaped subpixel having a first longest dimension and two rectilinearly shaped side subpixels each having longest dimensions that are smaller than that of the central subpixel.

* * * * *